US00RE46658E

(19) United States
(12) Reissued Patent
Richardson, III et al.

(10) Patent Number: US RE46,658 E
(45) Date of Reissued Patent: *Jan. 2, 2018

(54) COMPOSITE LAMINATE FOR A THERMAL AND ACOUSTIC INSULATION BLANKET

(71) Applicant: E I DU PONT DE NEMOURS AND COMPANY, Wilmington, DE (US)

(72) Inventors: Llewellyn Bentley Richardson, III, Chesterfield, VA (US); Warren Francis Knoff, Richmond, VA (US); Jian Wang, Midlothian, VA (US)

(73) Assignee: E I DU PONT DE NEMOURS AND COMPANY, Wilmington, DE (US)

( * ) Notice: This patent is subject to a terminal disclaimer.

(21) Appl. No.: 14/515,267

(22) Filed: Oct. 15, 2014

Related U.S. Patent Documents

Reissue of:
(64) Patent No.: 8,292,027
Issued: Oct. 23, 2012
Appl. No.: 12/759,741
Filed: Apr. 14, 2010

U.S. Applications:
(60) Provisional application No. 61/171,163, filed on Apr. 21, 2009.

(51) Int. Cl.

| | |
|---|---|
| ***E04B 1/84*** | (2006.01) |
| ***D04B 1/00*** | (2006.01) |
| ***B32B 7/02*** | (2006.01) |
| ***B32B 27/00*** | (2006.01) |
| ***B64C 1/10*** | (2006.01) |
| ***B32B 17/10*** | (2006.01) |

(Continued)

(52) U.S. Cl.
CPC ..... *F16F 15/02* (2013.01)

(58) Field of Classification Search
CPC ..... E04B 1/78; E04B 1/86; E04B 1/88; B64C 1/40; B32B 27/00; B32B 27/32
See application file for complete search history.

(56) References Cited

U.S. PATENT DOCUMENTS

| | | | |
|---|---|---|---|
| 3,325,340 | A | 6/1967 | Walker |
| 3,346,219 | A | 10/1967 | Salyer et al. |
| 3,434,917 | A | 3/1969 | Kraus et al. |

(Continued)

FOREIGN PATENT DOCUMENTS

| | | | |
|---|---|---|---|
| BE | 905985 | A1 | 4/1987 |
| CN | 1141866 | A | 2/1997 |

(Continued)

OTHER PUBLICATIONS

Khang D. Tran, Light Weight Fire Barrier Materials for Aircraft Fuselage Thermal/ Acoustical Insulation; The Mexmil Company, Santa Ana, California, USA—Date Unavailable.

(Continued)

*Primary Examiner* — Carlos Lopez

(57) ABSTRACT

This invention is directed to a composite laminate comprising in order (a) a flame retardant polymeric moisture barrier (b) an inorganic platelet layer and (c) a flame retardant thermoplastic film layer The invention is also directed to a thermal insulation and acoustic blanket comprising a core of fibrous material or foam surrounded by the above composite laminate wherein the thermoplastic film layer of the composite laminate contacts and encapsulates the core.

36 Claims, 1 Drawing Sheet

(51) Int. Cl.

| | |
|---|---|
| ***B32B 27/32*** | (2006.01) |
| ***F16F 15/02*** | (2006.01) |

(56) References Cited

U.S. PATENT DOCUMENTS

| | | | | |
|---|---|---|---|---|
| 3,841,954 | A | 10/1974 | Lawler | |
| 4,655,842 | A | 4/1987 | Ou et al. | |
| 4,698,267 | A | 10/1987 | Tokarsky | |
| 4,729,921 | A | 3/1988 | Tokarsky | |
| 4,780,147 | A | 10/1988 | Ou et al. | |
| 4,810,565 | A | 3/1989 | Wasitis et al. | |
| 4,940,112 | A | 7/1990 | O'neill | |
| 5,026,456 | A | 6/1991 | Hesler et al. | |
| 5,030,518 | A * | 7/1991 | Keller | 428/550 |
| 5,084,136 | A | 1/1992 | Haines et al. | |
| 5,126,013 | A * | 6/1992 | Wiker et al. | 162/156 |
| 5,223,094 | A | 6/1993 | Kirayoglu et al. | |
| 5,244,729 | A | 9/1993 | Harrison | |
| 5,314,742 | A | 5/1994 | Kirayoglu et al. | |
| 5,336,348 | A | 8/1994 | Mindler | |
| 5,373,038 | A * | 12/1994 | Horacek | 524/100 |
| 5,595,817 | A * | 1/1997 | Sch afer et al. | 442/379 |
| 5,760,146 | A * | 6/1998 | von Gentzkow et al. | 525/486 |
| 5,765,318 | A * | 6/1998 | Michelsen | 52/98 |
| 5,888,610 | A | 3/1999 | Fournier et al. | |
| 6,244,729 | B1 | 6/2001 | Waldmann | |
| 6,291,053 | B1 | 9/2001 | Peiffer et al. | |
| 6,322,022 | B1 | 11/2001 | Fay et al. | |
| 6,443,257 | B1 | 9/2002 | Wiker et al. | |
| 6,565,040 | B2 * | 5/2003 | Fay et al. | 244/121 |
| 6,627,561 | B1 * | 9/2003 | Wulliman et al. | 442/1 |
| 6,670,291 | B1 * | 12/2003 | Tompkins et al. | 442/136 |
| 7,767,597 | B2 | 8/2010 | Garvey | |
| 8,292,027 | B2 | 10/2012 | Richardson, III et al. | |
| 8,387,748 | B2 | 3/2013 | Richardson, III et al. | |
| 8,607,926 | B2 | 12/2013 | Richardson, III et al. | |
| 8,607,927 | B2 | 12/2013 | Richardson, III et al. | |
| 8,607,928 | B2 | 12/2013 | Richardson, III et al. | |
| 8,678,133 | B2 | 3/2014 | Clausi et al. | |
| 8,869,933 | B1 * | 10/2014 | McKnight et al. | 181/286 |
| 9,056,666 | B2 | 6/2015 | Richardson, III et al. | |
| 9,242,717 | B2 | 1/2016 | Richardson, III et al. | |
| 2003/0170418 | A1 | 9/2003 | Mormont | |
| 2004/0211506 | A1 | 10/2004 | Wang et al. | |
| 2005/0173780 | A1 * | 8/2005 | Sethumadhavan et al. | 257/632 |
| 2006/0046598 | A1 * | 3/2006 | Shah | 442/394 |
| 2006/0128866 | A1 * | 6/2006 | Diakoumakos et al. | 524/445 |
| 2007/0155265 | A1 | 7/2007 | Anderson | |
| 2008/0153373 | A1 * | 6/2008 | Hall et al. | 442/148 |
| 2008/0156367 | A1 * | 7/2008 | Uschold et al. | 136/256 |
| 2008/0189840 | A1 * | 8/2008 | Knoff et al. | 2/458 |
| 2008/0254313 | A1 * | 10/2008 | Kennedy et al. | 428/620 |
| 2009/0094754 | A1 * | 4/2009 | Hall et al. | 5/698 |
| 2009/0269565 | A1 * | 10/2009 | Peng | 428/220 |
| 2009/0314480 | A1 * | 12/2009 | Grinbergs et al. | 165/174 |
| 2010/0024969 | A1 | 2/2010 | Wang et al. | |
| 2010/0056687 | A1 * | 3/2010 | Diakoumakos et al. | 524/396 |
| 2010/0065368 | A1 | 3/2010 | Tazian | |
| 2010/0133039 | A1 | 6/2010 | Liguore | |
| 2010/0159221 | A1 | 6/2010 | Kourtakis et al. | |
| 2010/0173152 | A1 | 7/2010 | Beraud et al. | |
| 2010/0209679 | A1 | 8/2010 | Tompkins | |
| 2010/0243807 | A1 * | 9/2010 | Hossain et al. | 244/121 |
| 2011/0094826 | A1 | 4/2011 | Richardson, III et al. | |
| 2011/0114342 | A1 | 5/2011 | Ono et al. | |
| 2012/0003451 | A1 | 1/2012 | Weigel et al. | |
| 2012/0128959 | A1 | 5/2012 | Fernando | |
| 2012/0273618 | A1 | 11/2012 | Fernando | |
| 2012/0321848 | A1 | 12/2012 | Richardson, III et al. | |
| 2012/0321849 | A1 | 12/2012 | Richardson, III et al. | |
| 2012/0321868 | A1 | 12/2012 | Richardson, III et al. | |
| 2012/0321883 | A1 | 12/2012 | Richardson, III et al. | |
| 2013/0068555 | A1 | 3/2013 | Cherniak et al. | |
| 2013/0092321 | A1 | 4/2013 | Fernando et al. | |
| 2013/0196136 | A1 * | 8/2013 | Contzen et al. | 428/221 |
| 2013/0240291 | A1 | 9/2013 | Tinianov | |
| 2014/0008145 | A1 | 1/2014 | Lin et al. | |
| 2014/0011006 | A1 * | 1/2014 | Guinaldo Fernandez et al. | 428/201 |
| 2014/0065357 | A1 | 3/2014 | Richardson, III et al. | |
| 2014/0072762 | A1 | 3/2014 | Richardson, III et al. | |
| 2014/0072763 | A1 | 3/2014 | Richardson, III et al. | |
| 2014/0144723 | A1 | 5/2014 | Kim et al. | |
| 2014/0272252 | A1 * | 9/2014 | Golden | 428/69 |

FOREIGN PATENT DOCUMENTS

| | | | |
|---|---|---|---|
| EP | 0044162 | A2 | 1/1982 |
| EP | 0501271 | | 9/1992 |
| EP | 0601877 | A1 | 6/1994 |
| EP | 1326745 | B1 | 11/2006 |
| EP | 2421750 | B1 | 1/2013 |
| WO | 2001/98434 | A1 | 12/2001 |
| WO | 2002/032663 | A1 | 4/2002 |
| WO | 2006/028666 | A2 | 3/2006 |
| WO | 2008/136875 | A1 | 11/2008 |
| WO | 2009/052015 | A2 | 4/2009 |
| WO | 2014/018107 | | 1/2014 |

OTHER PUBLICATIONS

U.S. Appl. No. 14/081,010, filed Nov. 15, 2013, Richardson, III et al.

U.S. Appl. No. 14/081,022, filed Nov. 15, 2013, Richardson, III et al.

U.S. Appl. No. 14/077,394, filed Nov. 12, 2013, Richardson, III et al.

HT4795EP/EPT EPO Communication with Jehier Brief (English Translation)—Oct. 23, 2013.

HT4795EP/EPT EPO Communication with COGEBI Opposition Brief—Oct. 23, 2013.

HT4795EPEPT DuPont Reply Brief—May 21, 2014.

Jacques, A. et al., Development of A Thermal/Acoustic Insulating Blanket Responding to the Far 25.856 by the Integration of Mica Flame Barrier, Fire and Cabin Safety Research Conference, Lisbon, pp. 1-9, Nov. 18, 2004.

Gilmer, Carter T., et al., Polymer Mechanical Properties via a New Laboratory Tensile Tester, Journal of Chemical Education, vol. 73, No. 11, pp. 1062-1065, Nov. 1996.

DOT/FAA/AR-00/12, Aircraft Materials Fire Test Handbook, Office of Aviation Research, Washington, D.C. 20591, Apr. 2000.

ASTM D882-09, Standard Test Method for Tensile Properties of Thin Plastic Sheeting, ASTM International, Feb. 7, 2014.

ASTM-F501-93, Standard Test Method for Aerospace Materials Response to Flame, With Vertical Test Specimen (for Aerospace Vehicles Standard Conditions), American Society for Testing and Materials, Mar. 11, 2014.

ASTM E96/E96M-05.

FAR 25.853, Oct. 15, 2004.

FAR 25.856(b).

FAR 25, Appendix F, Part 1—Jul. 14, 2003.

NFPA 2112: Section 8.2.

Affidavit—A signed statement by Mr. Dogan Ogreten, R&D Manager at JEHIER SAS, the company marketing the product Terflame 29—Oct. 15, 2013 (Translation provided in HT4795EP/EPT EPO Communication with Jehier Brief cited above).

A description of the product Terflame 29 qualified by Airbus since Jun. 2008 and marketed since May 2008—Oct. 16, 2013 (Translation provided in HT4795EP/EPT EPO Communication with Jehier Brief cited above).

HT4795WOPCT—International Search Report and Written Opinion (PCT/US2010/031377—dated Jul. 27, 2010.

HT4795WOPCT—International Preliminary Report on Patentability (PCT/US2010/031377—dated Oct. 25, 2011.

(U.S. Appl. No. 12/759,741)—Non-Final Office Action dated Feb. 1, 2012.

(U.S. Appl. No. 12/759,741)—Response to Non-Final Office Action dated Apr. 18, 2012.

(56) References Cited

OTHER PUBLICATIONS (U.S. Appl. No. 12/759,741)—Final Office Action dated Jun. 4, 2012.
(U.S. Appl. No. 12/759,741)—Response to Final Office Action dated Jun. 22, 2012.
(U.S. Appl. No. 13/325,741)—Non-Final Office Action dated Mar. 26, 2013.
(U.S. Appl. No. 13/325,741)—Response to Non-Final Office Action dated Jul. 25, 2013.
(U.S. Appl. No. 13/325,770)—Non-Final Office Action dated Mar. 26, 2013.
(U.S. Appl. No. 13/325,770)—Response to Non-Final Office Action dated Jul. 25, 2013.
(U.S. Appl. No. 13/325,804)—Non-Final Office Action dated Mar. 26, 2013.
(U.S. Appl. No. 13/325,804)—Response to Non-Final Office Action dated Jul. 25, 2013.
(U.S. Appl. No. 14/077,394)—Non-Final Office Action dated Sep. 3, 2014.
Report on Filing of an Action Regarding a Patent (U.S. Pat. No. 8,607,926), Oct. 1, 2014, Delaware.
Complaint (U.S. Pat. No. 8,607,926), Oct. 1, 2014, Delaware.
Answer, Affirmative Defenses, Counterclaims (U.S. Pat. No. 8,607,926), Nov. 21, 2014, Delaware.
Defendant's First Amended Answer (U.S. Pat. No. 8,607,926), Dec. 19, 2014, Delaware.
Protective Order (U.S. Pat. No. 8,607,926), Mar. 23, 2015, Delaware.
Defendant's Invalidity Contentions (Redacted) (U.S. Pat. No. 8,607,926), May 18, 2015, Delaware.
Memorandum Order re Motion to Dismiss (U.S. Pat. No. 8,607,926), Aug. 5, 2015, Delaware.
Plaintiff's Brief in Support of Motion to Dismiss (U.S. Pat. No. 8,607,926), Jan. 9, 2015, Delaware.
Answer Brief in Opposition to Plaintiff's Motion to Dismiss (U.S. Pat. No. 8,607,926), Feb. 2, 2015, Delaware.
Plaintiff's Reply in Support of Motion to Dismiss (U.S. Pat. No. 8,607,926), Feb. 12, 2015, Delaware.
Defendant's Letter to Judge Andrews re addl authority (U.S. Pat. No. 8,607,926), Mar. 3, 2015, Delaware.
Plaintiff's Response to Subsequent Authority (U.S. Pat. No. 8,607,926), Mar. 6, 2015, Delaware.
Dow Corning 280A Adhesive, 2001 (no month).
(U.S. Appl. No. 14/081,010)—Final Office Action dated Mar. 12, 2015.
(U.S. Appl. No. 14/081,010)—Reply to Final Office Action dated May 18, 2015.
(U.S. Appl. No. 14/081,022)—Final Office Action dated Mar. 12, 2015.
(U.S. Appl. No. 14/081,022)—Reply to Final Office Action dated May 28, 2015.
(U.S. Appl. No. 14/515,4386)—Non-Final Office Action dated May 29, 2015.
Unifrax's Discovery Letter, Redacted (U.S. Pat. No. 8,607,926), May 27, 2016, Delaware.
DuPont's Discovery Letter, Redacted (U.S. Pat. No. 8,607,926), May 27, 2016, Delaware.
Unifrax's Discovery Response, Redacted (U.S. Pat. No. 8,607,926), May 31, 2016, Delaware.
DuPont's Discovery Response, Redacted (U.S. Pat. No. 8,607,926), May 31, 2016, Delaware.
Order RE Discovery Dispute (U.S. Pat. No. 8,607,926), Jun. 14, 2016, Delaware.
Unifrax's Supplemental Discovery Letter, Redacted (U.S. Pat. No. 8,607,926), Jun. 17, 2016, Delaware.
Expert Report of Thomas J. Nosker, Ph.D. (U.S. Pat. No. 8,607,926), Jun. 17, 2016, Delaware.
DuPont's Supplemental Discovery Letter, Redacted (U.S. Pat. No. 8,607,926), Jun. 21, 2016, Delaware.
Unifrax's Initial Invalidity Contentions (U.S. Pat. No. 8,607,926), May 18, 2015, Delaware.
Revised Joint Claim Construction Chart (U.S. Pat. No. 8,607,926), Sep. 30, 2015, Delaware.
Markman Joint Claim Construction Brief (U.S. Pat. No. 8,607,926), Nov. 16, 2015, Delaware.
Markman Hearing Transcript (U.S. Pat. No. 8,607,926), Dec. 14, 2015, Delaware.
Unifrax's Second Amended Answer, Affirmative Defenses, and Counterclaims, Redacted (U.S. Pat. No. 8,607,926), Dec. 22, 2015, Delaware
Plaintiff DuPont's Answer to Defendant Unifrax's Second Amended Answer, Defenses, and Counterclaims, Redacted (U.S. Pat. No. 8,607,926), Jan. 12, 2016, Delaware.
Markman Claim Construction Decision (U.S. Pat. No. 8,607,926), Jan. 13, 2016, Delaware.
Letter to Judge Andrews RE: Proposed Claim Construction Orders (U.S. Pat. No. 8,607,926), Jan. 19, 2016, Delaware.
Claim Construction Order (U.S. Pat. No. 8,607,926), Jan. 20, 2016, Delaware.
Defendant Unifrax's Supplemental Invalidity Contentions, Redacted (U.S. Pat. No. 8,607,926), Mar. 25, 2016, Delaware.
Stipulation and Order of Dismissal of Defendant Unifrax's Counterclaim III Without Prejudice (U.S. Pat. No. 8,607,926), Apr. 22, 2016, Delaware.
Unifrax's Motion for Leave, Redacted (U.S. Pat. No. 8,607,926), Jul. 15, 2016, Delaware.
DuPont's Opposition to Unifrax's Motion for Leave, Redacted (U.S. Pat. No. 8,607,926), Jul. 29, 2016, Delaware.
Unifrax's Motion for Leave, Redacted (U.S. Pat. No. 8,607,926), Aug. 11, 2016, Delaware.
Khang D. Tran, Light Weight Fire Barrier Materials for Aircraft Fuselage Thermal/ Acoustical Insulation; The Mexmil Company, Santa Ana, California, USA.

* cited by examiner

COMPOSITE LAMINATE FOR A THERMAL AND ACOUSTIC INSULATION BLANKET

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

1. Field of Invention

This invention covers composite thermal laminates having flame resistant properties. The invention also covers use of the composite laminate in a thermal and acoustic blanket as may be found in an aircraft fuselage or a turbine engine compartment.

2. Background of the Invention

U.S. Pat. No. 6,322,022 to Fay et al. discloses burnthrough resistant systems for transportation especially aircraft.

U.S. Pat. No. 6,670,291 to Tomkins and Vogel-Martin describes a laminate sheet material for fire barrier applications.

There remains an ongoing need for thermal and acoustic blankets for aircraft structures having reduced weight and improved flame spread resistance.

SUMMARY OF INVENTION

This invention is directed to a composite laminate comprising in order (a) a polymeric moisture barrier having a thickness from 6.0 to 25.0 micrometers and a UL 94 flame classification of V-0, (b) an inorganic platelet layer having a thickness from 7.0 to 76.0 micrometers and a UL 94 flame classification of V-0 wherein the platelets comprising the platelet layer have an aspect ratio of from 100 to 20,000, and (c) a thermoplastic film layer having a thickness no greater than 25 micrometers, an average elongation to break no greater than 150% and a UL 94 flame classification of V-0. The invention is also directed to a thermal insulation and acoustic blanket comprising an inorganic or organic core surrounded by the above composite laminate wherein the thermoplastic film layer of the composite laminate contacts and encapsulates the core.

DETAILED DESCRIPTION OF THE INVENTION

Figure 1:
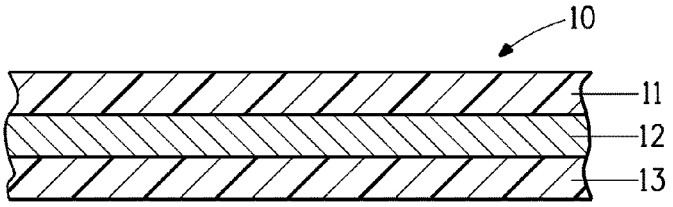
FIG. 1 is a schematic cross section through a burnthrough resistant composite laminate of this invention.

FIG. 1 shows a section through a burnthrough resistant composite laminate 10 comprising a polymeric moisture barrier 11, an inorganic platelet layer 12 and a thermoplastic film layer 13.

Moisture Barrier Layer

By moisture barrier is meant that the polymeric layer has an inability to pass liquids but has some ability to pass vapor. Typically, a 25 micrometer thick sample of the barrier material when tested by the water method of ASTM E96/E 96M-05 has a water vapor permeability not exceeding 60 g/($m^2$·24 h). An additional requirement is that the barrier should have a UL 94 flame classification of V-0. UL 94 flame classification is an Underwriters Laboratory test, The Standard for Flammability of Plastic Materials for Parts in Devices and Appliances, which measures a material's tendency either to extinguish or to spread the flame once the specimen has been ignited. V-0 indicates that the material is tested in a vertical position and self-extinguished within ten seconds after the ignition source is removed. A further requirement of the moisture barrier is that it should have a thickness in the range of from 6.0 to 25 micrometers. More preferably the thickness range should be from 6.0 to 20.0 micrometers and most preferably in the range from 6 to 10 micrometers. The barrier layer further provides mechanical strength and stiffness to the laminate as well as protecting the inorganic platelet layer. Preferred film materials are fluoropolymer, polyimide, polyetheretherketone (PEEK) and polyetherketoneketone (PEKK) all of which are commercially available. A suitable fluoropolymer is available from E.I. du Pont de Nemours, Wilmington, Del. under the tradename Tedlar. The surface of the barrier layer in contact with the inorganic platelet layer may optionally be treated to improve wetability and/or adhesion with the inorganic platelet layer. Suitable surface treatment methods include, but are not limited to, corona etching and washing with coupling agents such as ammonium, phosphonium or sulfonium salts. The outer surface of the barrier layer i.e. the surface not in contact with the inorganic platelet layer may optionally be coated with polyterafluoroethylene (PTFE) or may be metalized.

Platelet Layer

The thickness of an individual platelet typically ranges from about 5 Angstroms to about 5,000 Angstroms more preferably from about 10 Angstroms to about 4,200 Angstroms. The mean value of the maximum width of a platelet typically ranges from about 10,000 Angstroms to about 30,000 Angstroms The aspect ratio of an individual platelet typically ranges from 100 to 20,000.

In one embodiment of this invention, the inorganic platelet layer contains 100% platelets i.e. there is no carrier material such as resin, adhesive, cloth or paper. However, there may be some residual dispersant arising from incomplete drying of the platelet dispersion.

In another embodiment of this invention, a lightweight open weave fabric scrim is embedded into or laid onto the inorganic platelet layer to provide additional mechanical strength to the layer. The scrim can be made from natural, organic or inorganic fibers with glass, cotton, nylon or polyester being typical examples. A glass fiber scrim is particularly preferred for embedding into the platelet layer. The scrim may be a woven or knit structure and has a typical areal weight not exceeding 40 grams per square meter. The scrim is positioned into the platelet layer either after the platelet material has been coated onto the moisture barrier layer or while the platelet material is being coated onto the moisture barrier layer.

It is a requirement that the thickness of the platelet layer, without scrim, is from 7.0 to 76 micrometers and more preferably from 7.0 to 50 micrometers. A further requirement is that the platelet layer has a UL 94 flame classification of V-0. The function of the platelet layer, in which adjacent platelets overlap, is to provide a flame and hot gas impermeable barrier. The inorganic platelets may be clay, such as montmorillonite, vermiculite, mica, talc and combinations thereof. Preferably, the inorganic oxide platelets are stable (i.e., do not burn, melt or decompose) at about 600 degrees C., more preferably at about 800 degrees C. and most preferably at about 1000 degrees C. Vermiculite is the preferred platelet material for this invention. Vermiculite is a hydrated magnesium aluminosilicate micaceous mineral found in nature as a multilayer crystal. Vermiculite typically comprises by (dry) weight, on a theoretical oxide basis, about 38-46% $SiO_2$, about 16-24% MgO, about 11-16% $Al_2O_3$, about 8-13% $Fe_2O_3$ and the remainder generally oxides of K, Ca, Ti, Mn, Cr, Na, and Ba. "Exfoliated" vermiculite refers to vermiculite that has been treated, chemically or with heat, to expand and separate the layers of the crystal, yielding high aspect ratio vermiculite platelets. Suitable vermiculite materials are available from W. R. Grace of Cambridge, Mass., under the trade designations MicroLite 963 and MicroLite HTS-XE.

Film Layer

It is a requirement that the thermoplastic film layer has a thickness no greater than 25 micrometers. In a preferred embodiment, the thermoplastic film layer has a thickness no greater than 15 micrometers. More preferably the thickness is no greater than 10 micrometers. An additional requirement is that the thermoplastic film layer also has a UL 94 flame classification of V-0. A further requirement of this film layer is that the average elongation to break of the film is no greater than 150% and more preferably no greater than 125%. By average elongation we mean the average value of the elongation as measured in the machine direction and in the transverse direction which is a direction orthogonal to the machine direction. Preferably the film layer must also be capable of softening. By softening we mean that the film layer can soften sufficiently to bond to another thermoplastic film layer without completely melting. Preferred thermoplastic materials are polyketone, polyimide, polysulfone, polyarylene sulfide, fluoropolymers, liquid crystal polymers and polycarbonate. Examples of polyketone are polyetheretherketone (PEEK) and polyetherketoneketone (PEKK). Polyethersulfone and polyphenylsulfone are examples of polysulfone. Poly(p-phenylene sulfide is a suitable polyarylene sulfide for use in this invention. Polyvinylfluoride (PVF) and polyvinylidinefluoride (PVDF) are suitable examples of fluoropolymers. Polyarylate is an example of a suitable liquid crystal polymer. Some of these films may also be coated with a second polymeric material. For example, a polyimide film, Kapton®, may be coated with fluorinated ethylene propylene, FEP and used in this invention.

In a preferred embodiment, the moisture barrier membrane layer is polyimide and the thermoplastic film layer is PEKK.

Acoustic Blanket

The composite laminate as described above may be used as a component in a thermal insulation and acoustic blanket. A thermal insulation and acoustic blanket of this invention comprises:

(a) an inorganic or organic core having a self extinguishing time no greater than 10 seconds and a maximum burn length of no greater than 102 mm when tested in accordance with BSS7230 Method F1.

(b) a composite laminate surrounding the core material the laminate further comprising (1) a polymeric moisture barrier having a thickness from 6.0 to 25.0 micrometers and a UL 94 flame classification of V-0, (2) an inorganic platelet layer having a thickness from 7.0 to 76.0 micrometers and a UL 94 flame classification of V-0 wherein the platelets comprising the platelet layer have an aspect ratio of from 100 to 20,000, and (3) a thermoplastic film layer having a thickness no greater than 25 micrometers, an average elongation to break no greater than 150% and a UL 94 flame classification of V-0, wherein the thermoplastic film layer of the composite laminate contacts and encapsulates the core.

Figure 2:
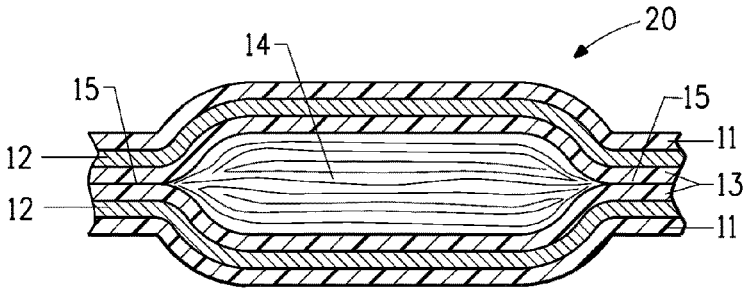
FIG. 2 is a schematic cross section through a thermal and acoustic blanket incorporating a burnthrough resistant composite laminate of this invention.

FIG. 2 shows a section through a thermal and acoustic blanket 20 suitable for use in an aircraft fuselage comprising a core material 14 encapsulated by a burnthrough resistant composite laminate said composite laminate comprising, in order, a thermoplastic film layer 13 in contact with the core, an inorganic platelet layer 12 and a moisture barrier 11 forming the outer surface of the laminate. The blanket is placed against the interior skin of an aircraft fuselage.

It is a requirement for the core 14 to meet the following flammability requirements. In a vertical test (60 seconds ignition), when tested according to Federal Aviation Regulation, Section 25, Appendix F, Part1, the core must be self extinguishing in no greater than 10 seconds and must have a maximum burn length of no greater than 102 mm. In a 45 Degree Angle Test, when tested according to BSS7230, the self extinguishing time must be no greater than 5 seconds and the afterglow no greater than 10 seconds.

The core may be foam or an organic or inorganic fibrous material. A suitable foam material is polyimide available under the tradename INSULMIDE from Johns Manville Insulations Group, Denver, Colo. or SOLIMIDE from Inspec Foams, Allen, Tex. Suitable non-metallic fibers include, but are not limited to, glass fibers, aramid fibers, crystalline ceramic oxide (including quartz) fibers, silicon nitride fibers, silicon carbide fibers, oxidized polyacrylonitrile fibers, carbon fibers, and combinations thereof.

Glass fiber is a preferred material with E-glass, a low alkali borosilicate glass, being particularly suitable. Ceramic oxide materials are typically metal oxides that have been consolidated by the action of heat. Ceramic oxide fibers generally refer to a class of fibers typically containing one or more oxides of aluminum, silicon, and boron. Many other additives may also be present (e.g., oxides of sodium, calcium, magnesium, and phosphorus) within the fibers, although the fibers include primarily metal oxides. Typically, the ceramic oxide fibers are crystalline ceramics and/or a mixture of crystalline ceramic and glass (i.e., a fiber that contains both crystalline ceramic and glass phases). Preferred ceramic oxide fibers are aluminosilicate, aluminoborosilicate, and alumina fibers, and may be in the form of yarns or in the form of staple fibers. The preferred form of non-metallic fiber is a batting which is a soft bulky assembly of fibers, usually carded. Battings have a typical density range of from 5.5 to 24.0 kg./$m^3$. Suitable glass batting is available under the MICROLITE AA tradename from Johns Manville OEM Insulations Division, Denver, Colo. The core may comprise more than one layer of material. The materials in different layers of the core need not be the same.

The core is encapsulated by the composite laminate. This is achieved by wrapping the composite laminate around the core 14 such that the thermoplastic film layer 13 is adjacent to the core. The composite laminate is subjected to sufficient heat to partially soften and fuse together the two thermoplastic film layers, as shown at 15 in FIG. 2. The thermoplastic film layers on the upper and lower surfaces of the core thus encapsulate the core around all four of its edges.

The partial softening can be achieved by means such as heat guns or ultrasonic bonding. The relative amount of core and laminate materials can be adjusted to suit particular thermal and acoustic blanket specifications but the general objective is to meet the necessary flame and noise standards at as low a blanket weight as possible. The moisture barrier outer layer of the blanket assembly minimizes moisture uptake and hence weight gain of the blanket during service. The composite laminate provides a flame spread barrier to the blanket assembly.

Test Methods

Figure 3:
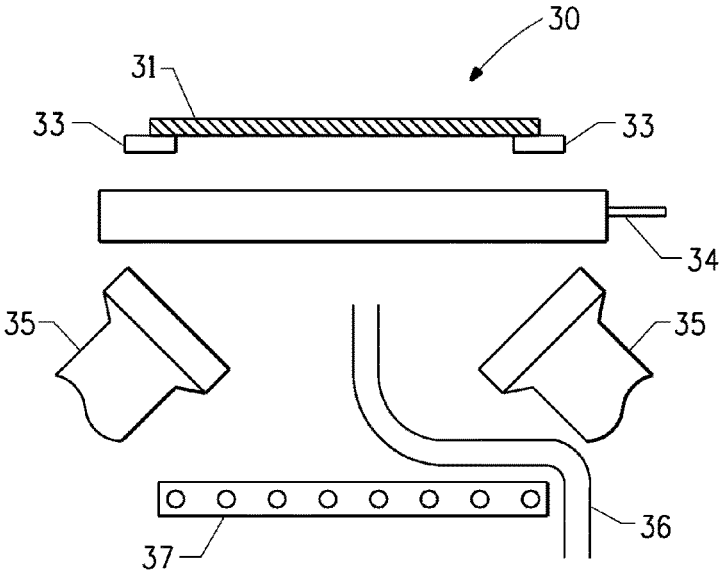
FIG. 3 is a schematic of the equipment used for the burnthrough test.

Burnthrough time was measured on a modified thermal protective performance (TPP) instrument as specified in Section 8.2 of NFPA 2112: Standard on Flame-Resistant Garments for Protection of Industrial Personnel Against Flash Fire, 2007 Edition. This is further explained by reference to FIG. 3. The TPP instrument, shown generally at 30, comprises two Meeker burners 35 positioned at 45 degree angles to the vertical providing flames that intersect to impinge the sample 31. In addition there is a bank of quartz tubes 37 that provides radiant heat. The sample is held in position by supports 33. A 9.5 mm copper airflow tube 36 allows approximately 20 liters per minute of air flow through the flame thus providing mass flux pressure beneath the sample. This allows the simulation of mass flux specified in Federal Aviation Regulation (FAR) 25.856(b). Propane flow to the burners was set at 5.0 liters per minute to produce an overall heat flux at the sample of 2.3 cal/cm$^2$-sec. with temperatures exceeding 1000° C. A water cooled shutter 34 prevents flame and heat from reaching the sample until the test is ready to start at which time the shutter is removed. Samples were subjected to the heat and mass fluxes until a hole developed in the sample, at which point the time was recorded as the burnthrough time and the test completed.

EXAMPLES

In the following examples, all parts and percentages are by weight and all degrees in centigrade unless otherwise indicated. Examples prepared according to the current invention are indicated by numerical values. Control or Comparative Examples are indicated by letters. Data and test results relating to the Comparative and Inventive Examples are shown in Table 1.

Example A was a 127 micron thick sample of Nomex® Type 418™ paper having an areal weight of 149 g/m$^2$. Nomex® Type 418™ is paper produced by blending about 50% mica platelets with short fibers (floc) and filmy particles (fibrids) of a synthetic m-aramid polymer followed by calendaring the paper at elevated temperature and pressure. Nomex® Type 418™ paper is available from E.I. DuPont de Nemours, Wilmington, Del. The use of Nomex® Type 418™ as a burnthrough barrier paper for aircraft thermal blanket applications is further described in U.S. Pat. Nos. 6,627,561 and 6,670,291 as well as in PCT patent application WO2006/028666. Three samples of this paper were submitted to the burnthrough test and gave burn times in the range of 1.05 to 2.28 minutes with an average burn time of 1.61 minutes. The end of test times were the same as the burn though times. The grade of a paper tested is compliant with FAR 25.856(b).

Example 1 was prepared in the following manner. A 7.6 micron layer of polyimide film available from DuPont under the tradename Kapton was used as the moisture barrier. The polyimide film had an areal weight of 12.2 g/m$^2$. An aqueous dispersion of MicroLite® 963 grade vermiculite platelets were used as received and coated onto the polyimide film using an adjustable micrometer film applicator from the Paul N. Gardner Company Inc., Pompano Beach, Fla. The coated vermiculite film was dried overnight at room temperature to remove residual dispersant. The vermiculite layer had an areal weight of 37.9 g/m$^2$. A 6.0 micrometer thick layer of PEKK having an areal weight of 9.2 g/m$^2$ and an average elongation to break of 120% was used as the thermoplastic film layer and was placed onto the vermiculite layer. The composite assembly was then placed in a press at a temperature of 180° C. for 40 seconds to consolidate the layers together into a laminate weighing 59.3 g/m$^2$. The consolidated composite laminate was subjected to the burnthrough test. There was no burnthrough after 5 minutes when the test was stopped. The composite laminate weighed only 40% of that of the Nomex® Type 418™ comparator yet had a far superior burnthrough resistance.

Example 2 was prepared in the following manner. A 6.0 micrometer thick layer of PEKK having an areal weight of 9.2 g/m$^2$ was used as the moisture barrier. Platelets of MicroLite®963 grade were coated onto the PEKK film as in Example 1. The coated film was dried overnight at room temperature to remove residual traces of dispersant. The vermiculite layer had an areal weight of 51.1 g/m$^2$. A 6.0 micrometer thick layer of PEKK having an areal weight of 9.2 g/m$^2$ and an average elongation to break of 120% was used as the thermoplastic film layer and was placed onto the vermiculite layer. The composite assembly was then placed in a press at a temperature of 180° C. for 40 seconds to consolidate the layers together into a laminate weighing 69.5 g/m$^2$. The consolidated composite laminate was subjected to the burnthrough test. There was no burnthrough after 5 minutes when the test was stopped. The composite laminate weighed only 47% of that of the Nomex® Type 418™ comparator yet had a far superior burnthrough resistance.

TABLE 1

| Example | Laminate Description | Burnthrough Time (min) | End of Test Time (min) |
|---|---|---|---|
| A | 127 micron Nomex ® Type 418 ™@ 149 gsm | 1.61 | 1.61 |
| 1 | 59.3 gsm composite of Kapton ®, vermiculite and PEKK | No burnthrough | 5 |
| 2 | 69.5 gsm composite of PEKK, vermiculite and PEKK | No burnthrough | 5 |

It is contemplated that the composite laminate of Examples 1 or 2 can be combined with a core of fiberglass batting such as a 25.4 mm thick sheet of Microlite® AA having a density of 6.7 Kg/m$^3$. In such a combination, a sheet of composite laminate is placed over both outer surfaces of the batting such that the thermoplastic film layer of the laminate is adjacent to, and in contact with, the outer surfaces of the batting. Furthermore, the composite laminates are of a larger area than the batting and extend over the four edges of the batting. The batting is encapsulated by crimping together the ends of the composite laminates that extend over the batting and, by applying heat in the crimp zone to soften and fuse the two laminates together, the batting is encapsulated.

It is also contemplated that the composite laminate of Examples 1 or 2 can be combined with a core of polyimide foam such as a 25.4 mm thick sheet of Solimide® TA-301 having a density of 6.4 Kg/m$^3$. In such a combination, a sheet of composite laminate is placed over both outer surfaces of the foam such that the thermoplastic film layer of the laminate is adjacent to, and in contact with, the outer surfaces of the foam. Furthermore, the composite laminates are of a larger area than the foam and extend over the four edges of the foam. The foam is encapsulated by crimping together the ends of the composite laminates that extend over the foam and, by applying heat in the crimp zone to soften and fuse the two laminates together, the foam is encapsulated.

What is claimed is:

1. A thermal insulation and acoustic blanket comprising (a) an inorganic or organic core having a self extinguishing time no greater than 10 seconds and a maximum burn length of no greater than 102 mm when tested in accordance with BSS7230 Method F1, (b) a composite laminate surrounding the core material the laminate further comprising (1) a polymeric moisture barrier having a thickness from 6.0 to 25.0 micrometers and a UL 94 flame classification of V-0, (2) [an] *a carrier free,* inorganic platelet layer having a thickness from 7.0 to 76.0 micrometers and a UL 94 flame classification of V-0 wherein the platelets comprising the platelet layer have an aspect ratio of from 100 to 20,000, and (3) a thermoplastic film layer having a thickness no greater than 25 micrometers, an average elongation to break no greater than 150% and a UL 94 flame classification of V-0, wherein the thermoplastic film layer of the composite laminate contacts and encapsulates the entire core.

2. The blanket of claim 1 wherein the core comprises a layer of mineral fiber batting.

3. The blanket of claim 1 wherein the core comprises polymeric foam.

4. The blanket of claim 1 wherein the moisture barrier contains a polymer wherein the polymer is selected from the group consisting of fluoropolymer, polyimide, polyetheretherketone and polyetherketoneketone.

5. The blanket of claim 1 wherein the outer surface of the moisture barrier is metalized.

6. The blanket of claim 1 wherein the inorganic platelet layer contains platelets selected from the group consisting of clay, vermiculite, mica, talc and combinations thereof.

7. The blanket of claim 1 wherein wherein the thermoplastic film contains polymer selected from the group consisting of polyketone, polyimide, polysulfone, polyarylene sulfide, fluoropolymer, liquid crystal polymer and polycarbonate.

8. The blanket of claim 7 wherein the thermoplastic film contains polymer selected from the group consisting of polyetheretherketone, polyetherketoneketone, polyetherimide, polyethersulfone, polyphenylsulfone, poly(p -phenylenesulfide), polyvinylfluoride, polyvinylidinefluoride and polyarylate.

*9. A thermal insulation and acoustic blanket, comprising:*

*(a) an inorganic or organic core,*

*(b) a laminate surrounding the core, the laminate comprising*

*(1) a polymeric moisture barrier,*

*(2) a carrier free, inorganic platelet layer consisting essentially of platelets of vermiculite, and*

*(3) a thermoplastic film layer,*

*wherein the thermoplastic film layer contacts and encapsulates the entire core.*

*10. The blanket of claim 9, wherein the core comprises a layer of mineral fiber batting.*

*11. The blanket of claim 9, wherein the core comprises foam.*

*12. The blanket of claim 9, wherein the moisture barrier contains polymer selected from the group consisting of fluoropolymer, polyimide, polyetheretherketone and polyetherketoneketone.*

*13. The blanket of claim 9, wherein the outer surface of the moisture barrier is metalized.*

*14. The blanket of claim 9, wherein the thermoplastic film layer contains polymer selected from the group consisting of polyketone, polyimide, polysulfone, polyarylene sulfide, fluoropolymer, liquid crystal polymer and polycarbonate.*

*15. The blanket of claim 9, wherein the thermoplastic film layer contains polymer selected from the group consisting of polyetheretherketone, polyetherketoneketone, polyetherimide, polyethersulfone, polyphenylsulfone, poly(p-phenylenesulfide), polyvinylfluoride, polyvinylidinefluoride and polyarylate.*

*16. The blanket of claim 9, wherein the carrier free, inorganic platelet layer consists of platelets of vermiculite.*

*17. The blanket of claim 9, wherein the laminate comprises two of the laminates with one of the laminates on one side of the core and the other laminate on an opposite side of the core with edge portions of the thermoplastic film layers of the two laminates fused together encapsulating the entire core.*

*18. The blanket of claim 9, wherein the platelets have an aspect ratio of from 100 to 20,000.*

*19. The blanket of claim 18, wherein the platelets have a thickness of from 5 Angstroms to 5,000 Angstroms.*

*20. The blanket of claim 9, wherein the thermoplastic film layer of the laminate contacts and encapsulates the entire core.*

*21. The blanket of claim 9, wherein the inorganic platelet layer has a thickness from 7.0 to 76.0 micrometers.*

*22. The blanket of claim 21, wherein the polymeric moisture barrier has a thickness from 6.0 to 25.0 micrometers.*

*23. The blanket of claim 22, wherein the thermoplastic film layer has a thickness no greater than 25 micrometers.*

*24. The blanket of claim 9, wherein the thermoplastic film layer and the moisture barrier are flame retardant.*

*25. The blanket of claim 24, wherein the polymeric moisture barrier and the thermoplastic film layer contain polyetheretherketone.*

*26. The blanket of claim 24, wherein the core is self-extinguishing.*

*27. A laminate, comprising:*

*(i) a polymeric moisture barrier, and*

*(ii) a carrier free, inorganic platelet layer consisting essentially of platelets of vermiculite.*

*28. The laminate of claim 27, wherein the moisture barrier contains polymer selected from the group consisting of fluoropolymer, polyimide, polyetheretherketone and polyetherketoneketone.*

*29. The laminate of claim 27, wherein an outer surface of the moisture barrier is metalized.*

*30. The laminate of claim 27, wherein the carrier free, inorganic platelet layer consists of platelets of vermiculite.*

*31. The laminate of claim 27, wherein the platelets have an aspect ratio of from 100 to 20,000.*

*32. The laminate of claim 31, wherein the platelets have a thickness of from 5 Angstroms to 5,000 Angstroms.*

*33. The laminate of claim 27, wherein the carrier free, inorganic platelet layer has a thickness from 7.0 to 76.0 micrometers.*

*34. The laminate of claim 33, wherein the polymeric moisture barrier has a thickness from 6.0 to 25.0 micrometers.*

*35. The laminate of claim 26, wherein the polymeric moisture barrier is flame retardant.*

*36. The laminate of claim 35 wherein the polymeric moisture barrier contains polyetheretherketone.*

* * * * *